United States Patent [19]
Kito

[11] 3,977,190
[45] Aug. 31, 1976

[54] PUMP SPEED DETECTING DEVICE

[75] Inventor: Masahiro Kito, Nagoya, Japan

[73] Assignee: Aisin Seiki Kabushiki Kaisha, Kariya, Japan

[22] Filed: May 7, 1975

[21] Appl. No.: 575,246

[30] Foreign Application Priority Data
May 7, 1974 Japan.............................. 49-49685

[52] U.S. Cl..................................... 60/459; 60/468
[51] Int. Cl.² ......................................... F15B 15/18
[58] Field of Search ............ 60/422, 431, 449, 459, 60/468, 494; 91/375 A

[56] References Cited
UNITED STATES PATENTS

| | | | |
|---|---|---|---|
| 2,773,351 | 12/1956 | Staude ................................. | 60/459 |
| 2,962,971 | 12/1960 | Hallman............................. | 60/494 X |
| 2,981,067 | 4/1961 | Clark et al............................ | 60/468 |
| 3,320,968 | 5/1967 | Nuss ................................... | 60/468 X |
| 3,908,779 | 9/1975 | Inoue................................. | 60/494 X |

Primary Examiner—Edgar W. Geoghegan
Attorney, Agent, or Firm—Oblon, Fisher, Spivak, McClelland & Maier

[57] ABSTRACT

A pump speed detecting device for diverse purposes in connection with various actuating devices disposed upon motor vehicles includes a pump, driven by a variable speed prime mover, for supplying fluid from a reservoir and discharging the same, at a flow rate proportional to the number of revolutions thereof, into a first conduit which is fluidically connected to a fluid motor. A flow control valve is fluidically connected to a first conduit so as to direct fluid from the first conduit into a second conduit which is in turn fluidically connected to the reservoir or the suction side of the pump. A first restriction is provided within the first conduit between the flow control valve and the fluid motor so as to control the flow control valve in response to the flow from the pump to the fluid motor. A second restriction is provided within the second conduit, and the actuating device is fluidically connected to the second conduit at a position just ahead of the orifice. Therefore, the actuating device is actuated by means of the fluid pressure which pressure increases as the number of revolutions of the pump increases.

9 Claims, 4 Drawing Figures

3,977,190

PUMP SPEED DETECTING DEVICE

BACKGROUND OF THE INVENTION

1. Field of the Invention:

The present invention relates generally to pump speed detecting devices, and more particularly to a pump speed detecting device capable of detecting the pump speed without the provision of an additional sensor mechanism.

2. Description of the Prior Art:

The engine speed or vehicle speed of a vehicle has been, for many years, conventionally detected for diverse useful purposes upon mobile apparatus. Within a power steering mechanism, for example, an output signal proportional to the vehicle speed has been conventionally generated and such generated output signal has in turn been led to the reaction chamber for increasing the reaction force in proportion to the vehicle speed in order to stabilize the steering operation at high vehicle speed.

In order to generate the output signal proportional to the vehicle speed, however, an extra sensory device, which detects the number of rotations of the vehicle wheel, has to be attached to the vehicle.

SUMMARY OF THE INVENTION

Accordingly, it is an object of the present invention to provide an improved pump speed detecting device which is capable of detecting the pump speed without the need of providing an extra sensor.

Another object of the present invention is to provide an improved pump speed detecting device which is simple in construction and low in cost.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference numerals designate like or corresponding parts throughout the several views and wherein.

DETAILED DESCRIPTION OF THE PREFERRED EMBODIMENTS

Figure 1:
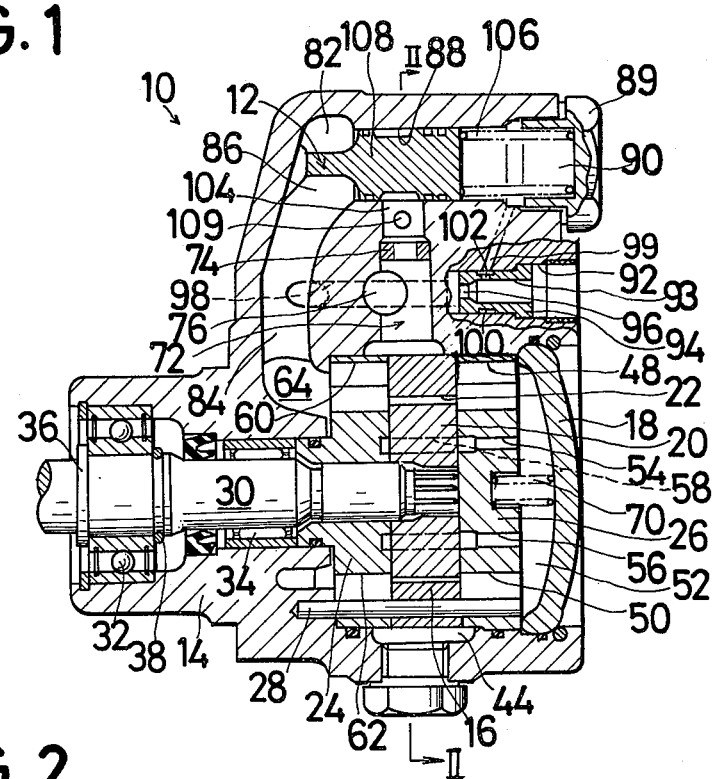
FIG. 1 is a longitudinal cross-sectional view of a first embodiment of a pump speed detecting device constructed in accordance with the present invention and showing its cooperative parts.
Figure 2:
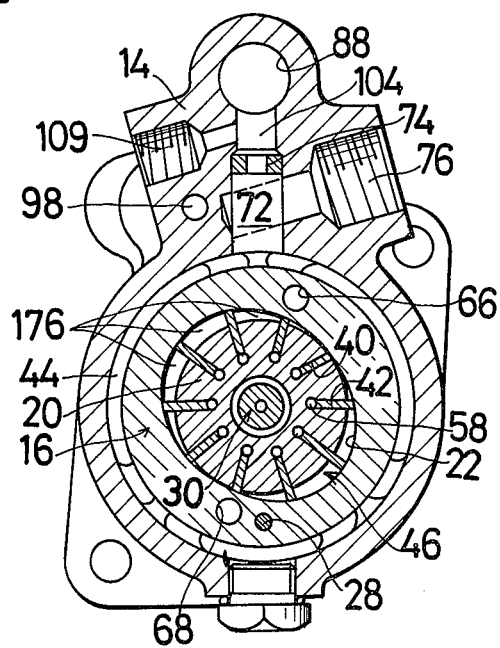
FIG. 2 is a cross-sectional view of the device illustrated within FIG. 1 taken along the line II—II in FIG. 1.
Figure 3:
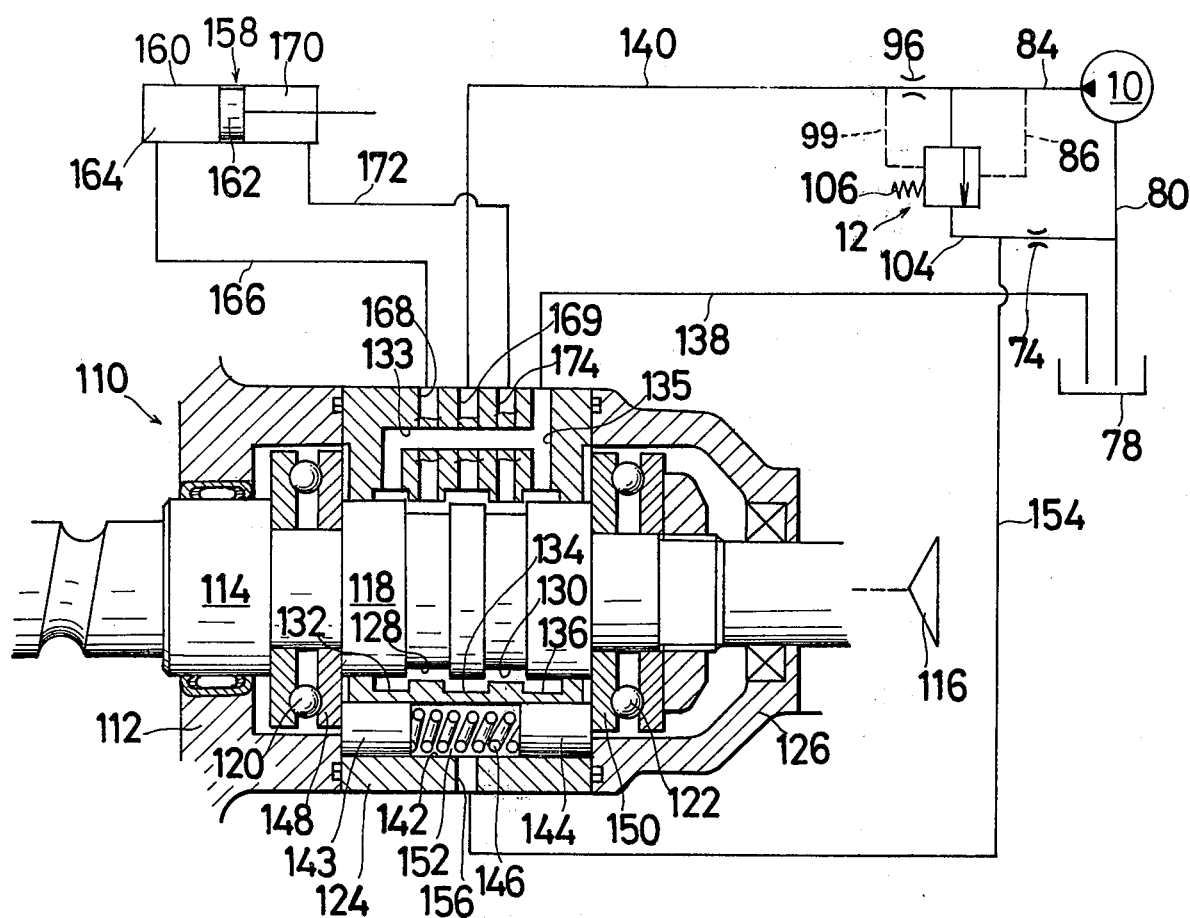
FIG. 3 is a schematic view, partly in cross-section, of the device illustrated within FIG. 1 and shown connected to a reaction chamber of a power steering mechanism by means of which the present invention may be practiced.

Referring now to the drawings, and more particularly to FIGS. 1, 2 and 3 thereof, a first embodiment of the present invention includes a pumping mechanism, generally indicated by the reference character 10, which includes a flow control valve, generally indicated by the reference character 12. The pump 10 comprises a body member 14, a ring or stator member 16 and a cover member 18 fixed within an end portion of the body member 14. A rotor 20 is telescopically disposed within an elliptically shaped bore 22 of ring 16, and the stator 16 and rotor 20 are axially sandwiched between a pair of side plates 24 and 26.

The stator ring 16 and the side plates 24 and 26 are secured to the body member 14 by means of a pin 28 passing therethrough so that rotation thereof is prevented while a slight axial movement thereof may be permitted. The rotor 20 is splined with and driven by means of a drive shaft 30 which may be an extension of the vehicle generator shaft, not shown, or which may alternatively be coupled to the vehicle engine in any suitable manner, and both side surfaces of the rotor 20 slidably contact the interior faces of the side plates 24 and 26. The shaft 30 is rotatably supported within the body member 14 through means of bearings 32 and 34, and the axial movement of shaft 30 is prohibited by means of a flanged portion 36 and a snap-ring 38 provided upon the outer periphery thereof.

The rotor 20 is provided with a plurality of circumferentially spaced, radially extending slits 40, ten slits being exemplarily shown within FIG. 2, within each of which is disposed a radially slidable vane 42, and the side plate 26 is provided with recesses, not shown, upon the side which faces the rotor 20, for delivering low pressure fluid into an annular chamber 44, defined between the body member 14 and the outer periphery of the ring 16, and into a chamber 46 defined by means of the elliptically shaped bore 22 and the side plates 24 and 26.

The side plate 26 is provided with two axially extending bores 48 and 50 for establishing fluidic communication between chamber 46 and a chamber 52 which is defined between the side plate 26 and the cover 18, and is further provided with four axial passages, only two of which 54 and 56 are shown in FIG. 1, for similarly establishing fluidic communication between chamber 52 and a plurality of chambers 58, each of which is defined by means of the inner end surface of one of the slits 40 and the inner end portion of one of the vanes 42.

The side plate 24 is similarly provided with recesses, not shown, within the side which faces the rotor 20, for establishing fluidic communication between the annular chamber 44 and the chamber 46 and is further provided with two axially extending bores 60 and 62 for establishing fluidic communication between the chamber 46 and an annular high pressure port 64. The ring 16 is likewise provided with two axial bores 66 and 68 for establishing fluidic communication between the chamber 52 and the high pressure port 64 through means of the passages 48 and 50 of the side plate 26 and the passages 60 and 62 of the side plate 24, and a spring 70, interposed between the cover 18 and the side plate 26, biases side plate 26 toward the rotor 20 so as to maintain the sliding contact between the side plate 24, the rotor 20, and the side plate 26.

A low pressure port 72 is provided within body 14 so as to extend perpendicularly upward from the upper end portion of the annular chamber 44, and a metering orifice 74 is disposed within the upper end portion of the low pressure port 72. The low pressure port 72 is fluidically connected, at its middle portion, with a transversely disposed inlet 76 which is in turn fluidically connected to a reservoir 78 by means of a conduit 80, as shown in FIG. 3.

A pressure chamber 82 is formed within the upper, left end portion of the body 14, and is fluidically communicated with high pressure port 64 through means of vertically extending passages 84 and 86. A cylindrical valve bore 88 extends horizontally from pressure chamber 82 into the right end portion of body 14, as shown within FIG. 1, and flow control valve 12 is slidably disposed therein. A plug 89 is hermetically threaded within the right end of the cylindrical bore 88 so as to define a chamber 90, in cooperation with the flow control valve 12, within which there is disposed a spring 106. An axially disposed cylindrical bore 92 is provided within the right side portion of the body 14, as shown in FIG. 1, and the right end of the bore is fluidically connected to a steering mechanism, generally indicated by the reference character 110, by means of a conduit 140, as seen in FIG. 3.

A metal member 94, formed with an axial bore 93 therethrough, is pressed into the bore 92, and it is seen that the axial bore 93 has a reduced diameter portion at the left end thereof so as to form a restricted orifice 96. The high pressure port 64 is fluidically communicated with the orifice 96 through means of the vertical passage 84 and a horizontally disposed passage 98 which extends from the left end portion of the bore 92 to the connecting point between passages 84 and 86. The spring chamber 90 is also fluidically communicated with the bore 93 through means of a transversely extending passage 99, an annular groove 100 being formed upon the outer peripheral surface of the metal member 94 while a vertically disposed passage 102 is formed within the same.

The low pressure port 72 communicates with the valve bore 88 through means of the orifice 74 and a vertically extending passage 104 formed within the body 14. The flow control valve 12 is biased by means of the spring 106, interposed between the right end surface of the valve 12 and the interior wall of the plug 89, to a position such that a valve land 108 of the valve 12 blocks communication between pressure chamber 82 and the passage 104, the latter of which communicates with an outlet 109.

Referring now more particularly to FIG. 3, the steering mechanism 110 is seen to comprise a steering gear housing 112 and a handle shaft 114 which is rotatably mounted and axially moveable within the steering gear housing 112. The handle shaft 114 is operatively connected at the right end portion thereof, as viewed within FIG. 3, to a steering wheel or handle 116, and the left end portion of the handle shaft 114 is connected to the vehicle wheels not shown, through means of a conventional ball bearing mechanism and a sector-gear shaft steering mechanism, also not shown, for steering of the vehicle.

An inner valve member 118 is supported by means of bearings 120 and 122, while an outer valve 124 is disposed coaxially with respect to the inner valve 118, both valves being interposed between the steering gear housing 112 and a cover member 126. Two annular grooves 128 and 130 are formed upon the outer peripheral surface of the inner valve 118, while three annular grooves 132, 134 and 136 are similarly formed upon the inner peripheral surface of the outer valve 124. The annular grooves 132 and 136 are connected to the reservoir 78 by means of passages 133 and 135 and a conduit 138, while the annular groove 134 is connected to bore 93 of member 94 by means of a passage 169 formed within the outer valve 124 and the conduit 140.

An axially extending bore 142 is formed within the outer valve 124, while two reaction pistons 143 and 144 are slidably disposed within the bore 142, a neutral spring 146 being interposed between the two reaction pistons 143 and 144. The outer end surface of piston 143 contacts the steering gear housing 112 and a bearing race 148 of the bearing 120, while the outer end surface of the piston 144 contacts the cover 126 and a bearing race 150 of the bearing 122. The bore 142 and the pistons 143 and 144 define a reaction chamber 152, and the outlet 109 of body 14 communicates with the reaction chamber 152 through means of a conduit 154, which intersects the passage 104 at a position just forward of the orifice 74 (see FIG. 1), and an inlet port 156 formed within the outer valve 124.

A fluid actuator, generally indicated by the reference character 158, comprises a fixed cylinder housing 160 and a piston 162, slidably disposed therein, which is operatively connected to wheels, not shown, by means of a linkage mechanism, whereby steering of the wheels is accomplished as a result of the sliding movement thereof. A first chamber 164, defined between the cylinder housing 160 and the left-side surface of the piston 162, is fluidically connected to the annular groove 128 of mechanism 110 through means of a conduit 166 and a passage 168 formed within the outer valve 124, while a second chamber 170, defined between the housing 160 and the right-side surface of the piston 162, is similarly fluidically connected to the annular groove 130 through means of a conduit 172 and a passage 174 formed within the outer valve 124.

The operation of the first embodiment of the present invention will now be described.

The low pressure fluid, conducted from the reservoir 78 into the low pressure port 72 through means of the conduit 80 and the inlet 76, flows into the chamber 46 through means of the annular chamber 44 and the recessed portions, not shown, of the side plates 24 and 26. When the rotor 20 is rotated, the vanes 42 are forced outwardly toward the ring 16 by means of centrifugal force, as well as the high pressure fluid conducted from the chamber 46 into the chambers 58 through means of the bores 48 and 50 of the side plate 26, chamber 52, and bores 54 and 56 of the side plate 26, and consequently, the outer, radial, axially extending, end surface, as well as both axially spaced, radially extending side surfaces of the vanes 42, slidably contact the ring 16 and the respective side plates 24 and 26, respectively.

As a result of such action, the vanes 42 are slidably moved within the slits 40 in accordance with the elliptically-configured inner surface of the ring 16, such that, ten chambers 176 are in effect formed within the apparatus, each of which is defined by means of the inner surface of the ring 16, side plates 24 and 26, the outer surface of the rotor 20, and two adjacent vanes 42. Each of the chambers undergoes expansion and contraction two times per revolution of the rotor 20, and the contraction of each chamber 176 increases the pressure within the chamber.

Each of the chambers 176 communicates with the low pressure port 72 through means of the recessed portions of the side plates 24 and 26 during the expansion phase thereof, and similarly, each of the chambers 176 communicates with the high pressure port 64 and the chamber 52 through means of the bores 60 and 62 of the side plate 24, as well as the bores 48 and 50 of the side plate 26, during the contraction phase thereof. The slidable contact between the rotor 20, the vanes 42, and the side plates 24 and 26 is maintained by means of the high pressure conducted to the chamber 52, while the slidable contact between such elements is also maintained by means of the spring 70 when the pressure within chamber 52 is low.

The pumping structure and operation thus far described is conventional. However, it is important to note that the high pressure fluid within the high pressure port 64 is conducted to the bore or passage 93 through means of the passage 98 and the restrictor orifice 96 as well as to the pressure chamber 82 through means of the passages 84 and 86. The fluid pressure within the bore 93 will be conducted to the steering mechanism 110 through means of the conduit 140, and it is also to be noted that the operation of the power steering mechanism 110, which will be described hereinafter, is also conventional.

During the non-rotating state of the steering wheel 116, all of the annular grooves 128, 130, 132, 134 and 136 are open and connected and the fluid pressure conducted from the bore 93 is permitted to return to the reservoir 78 through means of the passages 133 and 135 and the conduit 138. During the leftward rotational state of the steering wheel 116, however, the handle shaft 114 is moved toward the left, as seen in FIG. 3, together with the inner valve 118, the bearings 120 and 150, and the respective bearing races, and consequently, the reaction piston 144 is moved toward the left against the biasing force of the spring 146.

As a result of such movement, the communication between annular grooves 128 and 134, and 130 and 136, tends to become interrupted while the communication between annular grooves 134 and 130, and 132 and 128, tends to become established. The fluid pressure from the bore 93 to the annular groove 134 is thus supplied to the second chamber 170 of the actuator 158 through means of the annular groove 130, passage 174 and the conduit 172, while the first chamber 164 communicates with the reservoir 78 through means of conduit 166, passage 168, annular grooves 128 and 132, passage 133, and return conduit 138. In this manner, the pressure within chamber 170 is increased, whereby the piston 162 of the actuator 158 is slidably moved toward the left as the pressure within chamber 170 is greater than that within the first chamber 164. Therefore, the wheels, not shown, operatively connected to the piston 162 are moved toward the left.

Similarly, during the rightward rotational state of the steering wheel 116, the handle shaft 114 is moved toward the right, as seen in FIG. 3, along with the inner valve 118, the bearings 120 and 150, and the bearing races, thereof, and in this manner, the reaction piston 143 is moved toward the right against the biasing force of the spring 146. As a result of such movement, fluidic communication between the annular grooves 128 and 132, and 134 and 130 tends to become interrupted, while fluidic communication between the annular grooves 128 and 134, and 130 and 136 tends to become established.

Consequently, the fluid pressure from the bore 93 to the annular groove 134 is supplied to the first chamber 164 of the actuator 158 through means of the annular groove 128, passage 168, and conduit 166, and the second chamber 170 is able to communicate with the reservoir 78 through means of the conduit 172, passage 174, annular grooves 130 and 136, passage 135, and conduit 138. In this manner, the pressure within the chamber 164 is increased and thus, the piston 162 of the actuator 158, as well as the vehicle wheel mechanism connected thereto, is slidably moved toward the right as the pressure within chamber 164 is greater than that within the chamber 170.

The fluid pressure within bore 93 is also conducted to the spring chamber 90 through means of the passage 102 of the metal member 94, the annular groove 100 of the metal member 94, and the passage 99. During the low speed range of the engine, that is, during the low speed range of the pumping mechanism 10, the spring 106 maintains the flow control valve 12 within the illustrated position. As the pump speed increases, however, the amount of fluid pressure being discharged from the pump 10 increases so as to thereby produce a pressure difference across the orifice 96, and consequently, the pressure within chamber 82 gradually becomes greater than that within the spring chamber 90. When the pressure difference has become greater than a predetermined value, the flow control valve 12 is moved toward the plug 89 against the biasing force of the spring 106 thereby establishing fluidic communication between chamber 82 and the passage 104 as a result of the rightward movement of the land 108.

Since the pressure within chamber 82 is normally higher than the pressure within passage 104, the fluid pressure is in fact conducted from pressure chamber 82 into passage 104 as a result of the opening of the valve 12 and the fluid pressure conducted into passage 104 is in turn conducted into the low pressure port 72 through means of the orifice 74. The fluid is subsequently returned to the reservoir 78 through means of the inlet 76 and the conduit 80 or is alternatively conducted through the pump 10 through means of the annular chamber 44 and the recessed portion, not shown, of the side plates 24 and 26.

When the number of revolutions of the pump is greater than a predetermined value, the amount of fluid which is conducted from pressure chamber 82 into passage 104 increases in proportion to the number of revolutions of the pump, such that the pressure with passage 104 increases, as a result of the effect of orifice 74, as the number of revolutions of the pump increases. Since the increased pressure is in turn conducted to the reaction chamber 152 of the steering mechanism 110 through means of the outlet 109, conduit 154, and inlet port 156 of the outer valve 124, power proportional to the number of revolutions of the pump 10 acts upon the pistons 143 and 144. The pistons 143 and 144 are therefore slidably moved toward the left or right end of the bore 142, as a result of which, the axial movement of the bearing races 148 and 150, as well as that of the handle shaft 114 and the inner valve 118, is limited, or in other words, a steering resistance against the right or left rotation of the steering wheel 116 is created, which steering resistance increases in proportion to the engine speed, as is well known to those skilled in the art.

Figure 4:
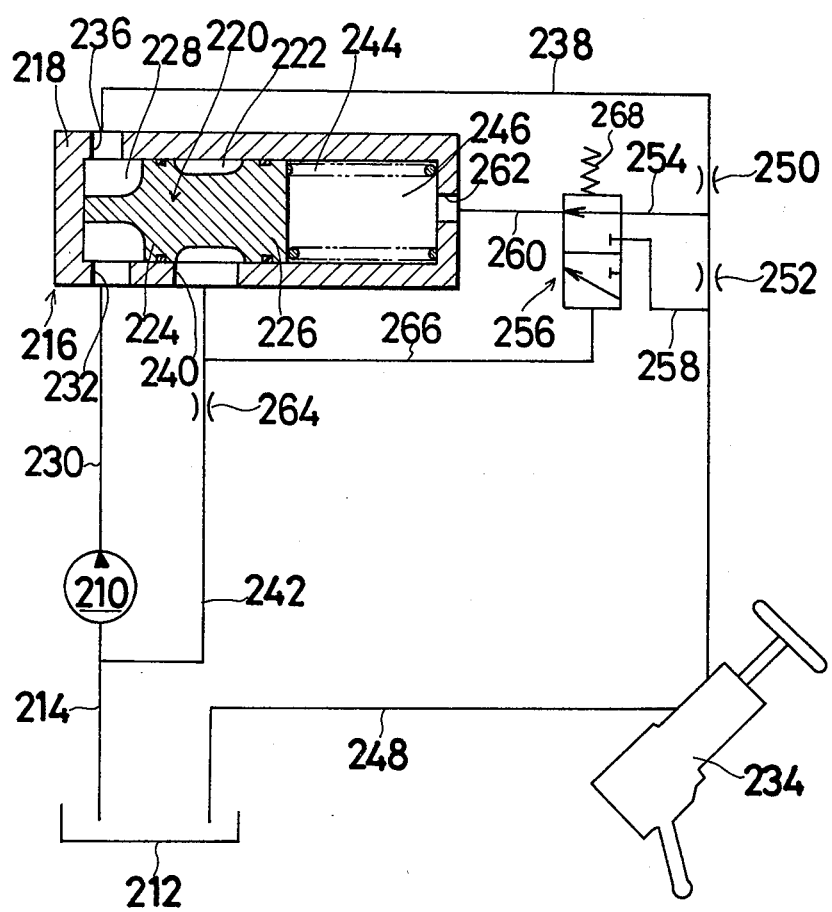
FIG. 4 is a schematic view, similar to that of FIG. 3, showing however a second embodiment of the present invention and which is connected to a change-over control valve by means of which the present invention may also be practiced.

Referring now to FIG. 4, a second embodiment of the present invention will now be described hereinbelow in detail. A pump 210 driven by means of a vehicle engine, not shown, is fluidically connected to a reservoir 212 by means of a conduit 214 and a flow control valve, generally indicated by the reference character 216, which comprises a cylinder housing 218 and a spool valve, generally indicated by the reference character 220, which is slidably disposed within cylinder housing 218. The spool valve 220 is, at the middle portion thereof, formed with an annular groove 222 upon the outer periphery thereof so as to provide two lands 224 and 226, and a pressure chamber 228 is defined by means of the left end surface of the spool valve 220 and the left end interior wall of the cylinder housing 218. The pump 210 is fluidically connected to the pressure chamber 228 through means of a conduit 230 and a passage 232 formed within the cylinder housing 218.

The pressure chamber 228 is in turn fluidically connected to a conventional torsion-bar type steering mechanism 234 through means of a passage 236 formed within the cylinder housing 218 and a conduit 238, and the annular groove 222 is fluidically connected to the conduit 214 through means of another passage 240 formed within the cylinder housing 218 and another conduit 242, the steering mechanism 234 also being connected to the reservoir 212 by means of a conduit 248. The spool valve 220 is biased toward the left, by means of a spring 244 interposed between the right end surface of the valve 220 and the right end interior wall of the cylinder housing 218, to a position such that the land 224 of the valve 220 blocks communication between the pressure chamber 228 and the passage 240 and conduit 242, and a spring chamber 246 is defined by means of the right end surface of the valve 220 and the interior walls of the cylinder housing 218 within the right end thereof.

The conduit 238 is provided with two orifices 250 and 252 arranged in series fashion therein and is also fluidically connected to a conduit 254, which is in turn fluidically connectable to a conventional change-over control valve 256, at a position interposed between the orifices 250 and 252. The conduit 238 is further fluidically connected to a conduit 258, which is also fluidically connectable to the change-over control valve 256, at a position disposed rearwardly of the second orifice 252, and the change-over control valve 256 is communicable with the spring chamber 246 of the flow control valve 216 through means of a conduit 260 and a passage 262 formed within the right end wall of cylinder housing 218. The conduit 242 is similarly provided with an orifice 264 therein, and in front of the orifice 264 the conduit 242 is connected to a conduit 266 which is in turn connected to the change-over control valve 256.

The operation of the second embodiment of the present invention will now be described.

During the low speed range of the pump 210, the spring 244 of the flow control valve 216 maintains the spool valve 220 within the position illustrated whereby the fluid pressure discharged from the pump 210 is conducted to the steering mechanism 234 through means of the conduit 230, passage 232, pressure chamber 228, passage 236, conduit 238, and the orifices 250 and 252. The pressurized fluid from the pump 210 is also conducted to the spring chamber 246 of the flow control valve 216 through means of the conduit 254, the changeover control valve 256, conduit 260, and passage 262 and the pressurized fluid conducted to the steering mechanism 234 is further conducted to the reservoir 212 through means of conduit 248.

During such operation, the land 224 of the spool valve 220 interrupts or blocks the communication between the passage 232 and the passage 240. However, as the speed of the pump 210 increases, the amount of pressurized fluid conducted to the steering mechanism 234 also increases thereby producing a pressure difference across the orifice 250, which flow to the steering mechanism 234 may be indicated by $Q_1$. Subsequently, when the number of revolutions of the pump 210 has reached a first predetermined value, the pressure within chamber 228 becomes greater than that within chamber 246 as a result of the pressure difference existing across the orifice 250, and consequently, the valve 220 begins to move toward the right against the biasing force of the spring 244 so as to thereby establish communication between passages 232 and 240. Fluid flow is therefore able to be conducted from chamber 228 into conduit 242.

The valve 220 moves further toward the right in accordance with any further increases in the number of revolutions of the pump 210, whereby the amount of flow to the conduit 242 is similarly increased so as to maintain the amount of flow to the steering mechanism 234, which flow may be indicated by $Q_2$, constant. The amount of flow $Q_2$ to the steering mechanism 234 is formulated as follows:

$$Q_2 = K \cdot A_1 \cdot \sqrt{\Delta p_1} \qquad 1$$

$$\Delta p_1 = F/A \qquad 2$$

wherein K is a ratio constant, $A_1$ is the area of the first orifice 250, $\Delta p_1$ is the pressure difference across the first orifice 250, A is the area of the spool valve 220 for receiving the pressure, and F is the spring force of the spring 244. Within the formula, it is noted that the spring constant of the spring 244 has been ignored, as the same is very small, and it will also be recognized that increasing the amount of flow to the conduit 242 likewise produces a pressure difference across the orifice 264.

When the number of revolutions of the pump 210 has reached a second predetermined value, the fluid conducted into the conduit 266, which is fluidically connected to the conduit 242 at a location just ahead of the orifice 264, overcomes the pre-loading force of the spring 268 and consequently, the fluid pressure within conduit 266 causes the change-over control valve 256 to terminate the fluidic communication between the conduit 254 and the conduit 260 and to establish fluidic communication between the conduit 258 and conduit 260.

Therefore, the pressure difference between chambers 228 and 246 is formulated as follows:

$$\Delta P'_1 + \Delta P_2 = F/A \qquad 3$$

wherein $\Delta P'_1$ is the pressure difference across the orifice 250 and $\Delta P_2$ is the pressure difference across the orifice 252. That is, the pressure difference $\Delta P'_1$ across the orifice 250 is:

$$\Delta P'_1 = \Delta P_1 - \Delta P_2$$

and thus, the amount of fluid flow to the steering mechanism 234, during such operation of the pump 210 when the number of revolutions is greater than the second predetermined value, may be indicated by $Q_3$, is seen to be equal to the amount of flow within the orifice 250, and may be formulated as follows:

$$Q_3 = K \cdot A_1 \cdot \sqrt{\Delta P'_1} = K \cdot A_1 \cdot \sqrt{\Delta P_1 - \Delta P_2} < Q_2 \qquad 4$$

Therefore, the amount of fluid flow to the steering mechanism 234, during the time the number of revolutions of the pump 210 is greater than the second predetermined value, is less than that during the time the number of revolutions of the pump 210 is greater than the first predetermined value but less than the second predetermined value.

During the operation of the second embodiment described heretofore, the pressure within the conduit 266 which controls the change-over control valve 256 is in proportion to:

$$(Q_1 - Q_2)^2$$

and consequently, the pressure within conduit 266, which controls the change-over control valve 256, is a function of the number of revolutions of the pump 210 whereby the pressure within conduit 266 can easily shift the change-over control valve 256 at the second predetermined value of the number of revolutions of the pump 210.

As described in detail heretofore, the amount of flow to the steering mechanism 234 is reduced during the high speed operative range of the pump 210 whereby the steering force of the vehicle becomes heavy, or in other words, the steering operation of the vehicle becomes stable during the high speed range of the engine.

Obviously, many modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A pump speed detecting device comprising:
   a pump, driven by a means of variable speed prime mover, for discharging fluid from a reservoir, at a flow rate proportional to the number of revolutions thereof, to a fluid motor fluidically connected to said pump by means of a first conduit;
   flow control valve means for diverting fluid from said first conduit;
   first means for controlling said flow control valve means in response to the fluid flow from said pump to said fluid motor;
   second conduit means for returning said diverted fluid to said reservoir or the suction side of said pump; and,
   second means for controlling an actuating means responsive to said fluid flow within said second conduit means.

2. A pump speed detecting device as set forth in claim 1, wherein:
   said second means is a restriction provided within said second conduit means.

3. A pump speed detecting device as set forth in claim 2, wherein:
   said first means is a restriction provided within said first conduit.

4. A pump speed detecting device as set forth in claim 3, wherein:
   said actuating means is a reaction means of a power steering mechanism for a vehicle for stabilizing the steering operation of said vehicle at high speed.

5. A pump speed detecting device as set forth in claim 4, wherein:
   said fluid motor is a power steering mechanism for a vehicle.

6. A pump speed detecting device set forth in claim 3, wherein:
   said actuating means is a change-over control valve fluidically connected to said flow control valve means.

7. A pump speed detecting device as set forth in claim 6 further including:
   means for controlling said flow control valve means in response to the fluid flow from said pump to said fluid motor in cooperation with said change-over control valve.

8. A pump speed detecting device as set forth in claim 7, wherein:
   said means is a restriction provided within said first conduit.

9. A pump speed detecting device as set forth in claim 8, wherein:
   said fluid motor is controlled by a torsion-bar type power steering mechanism.

* * * * *